Patented June 3, 1930

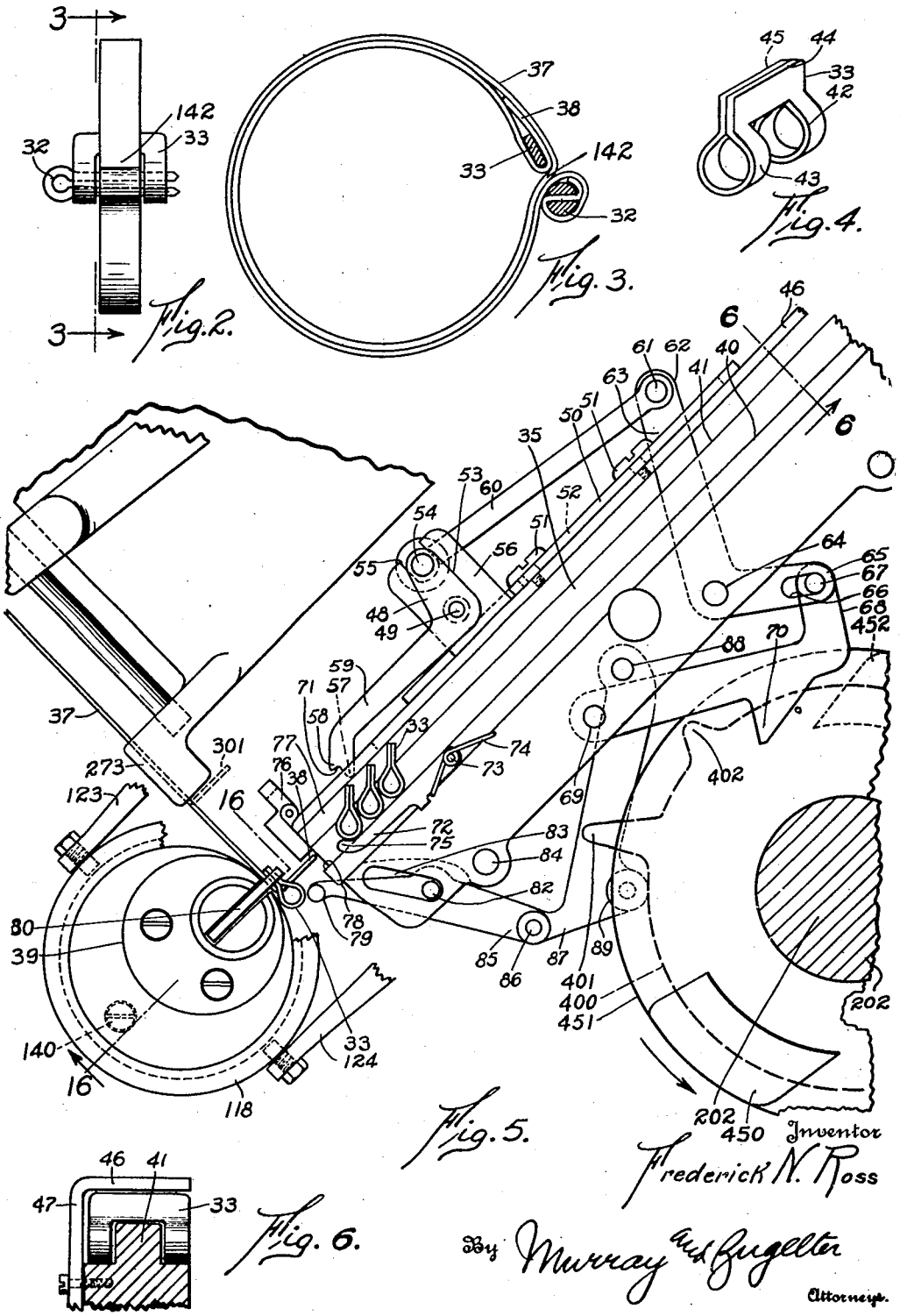

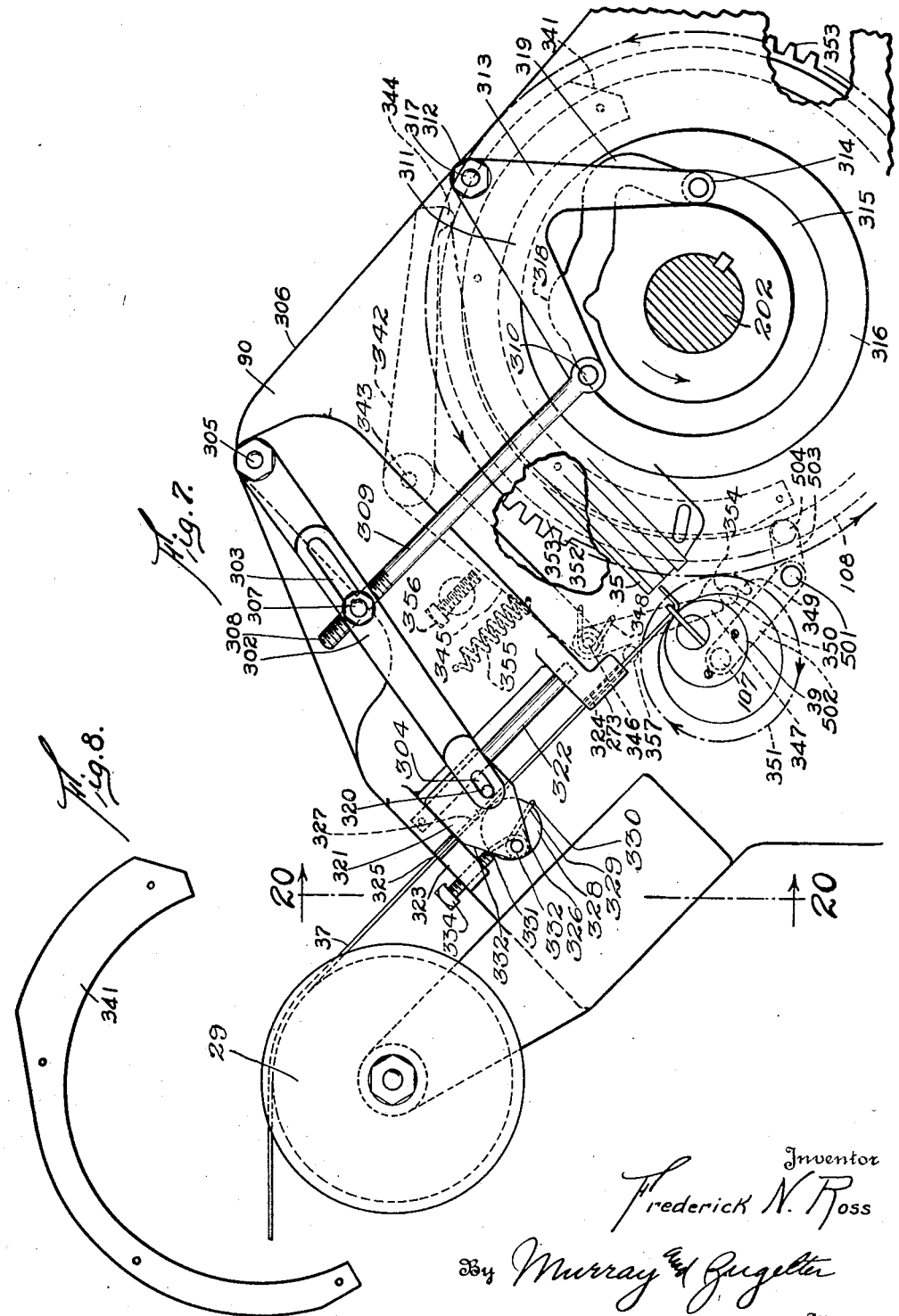

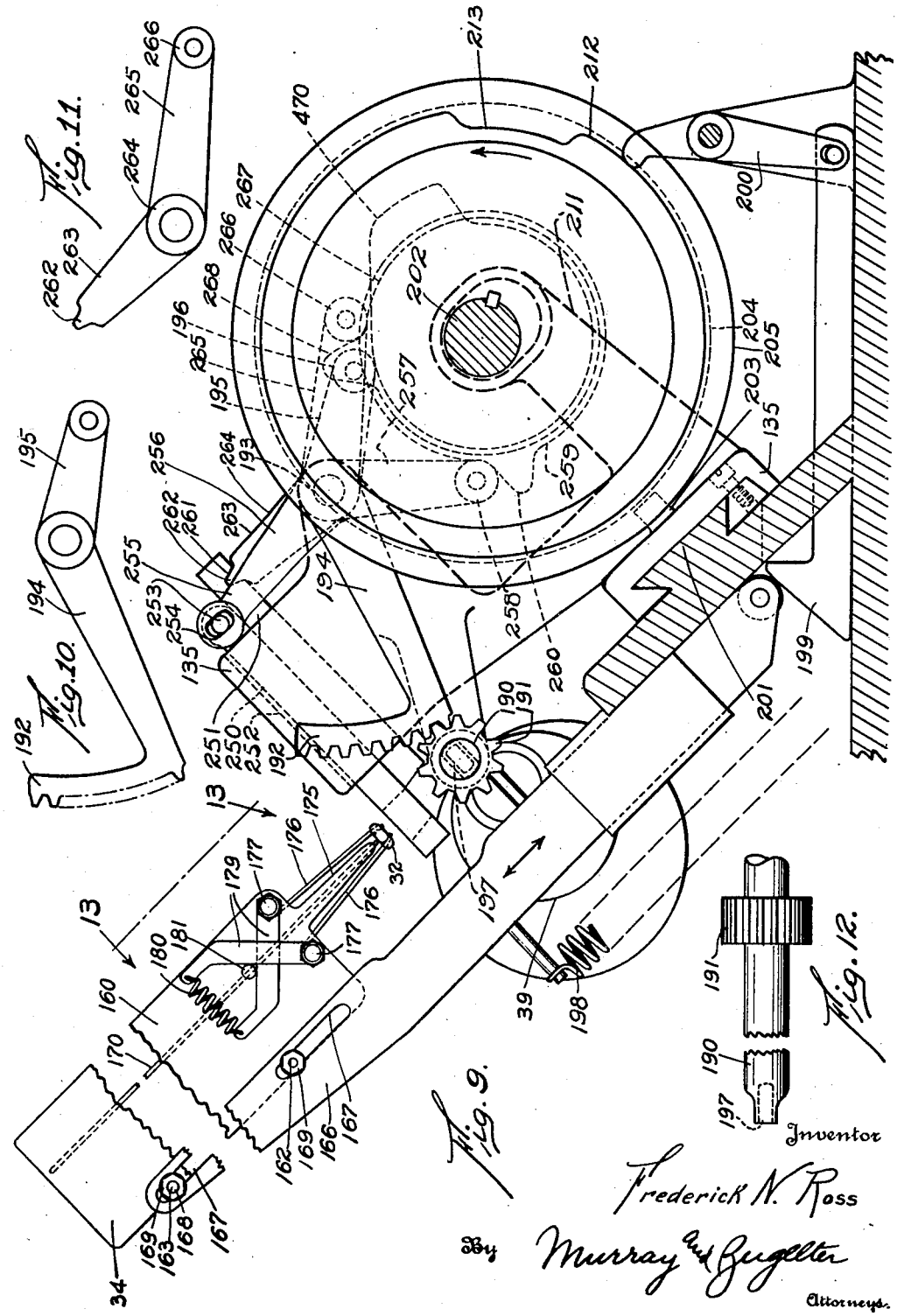

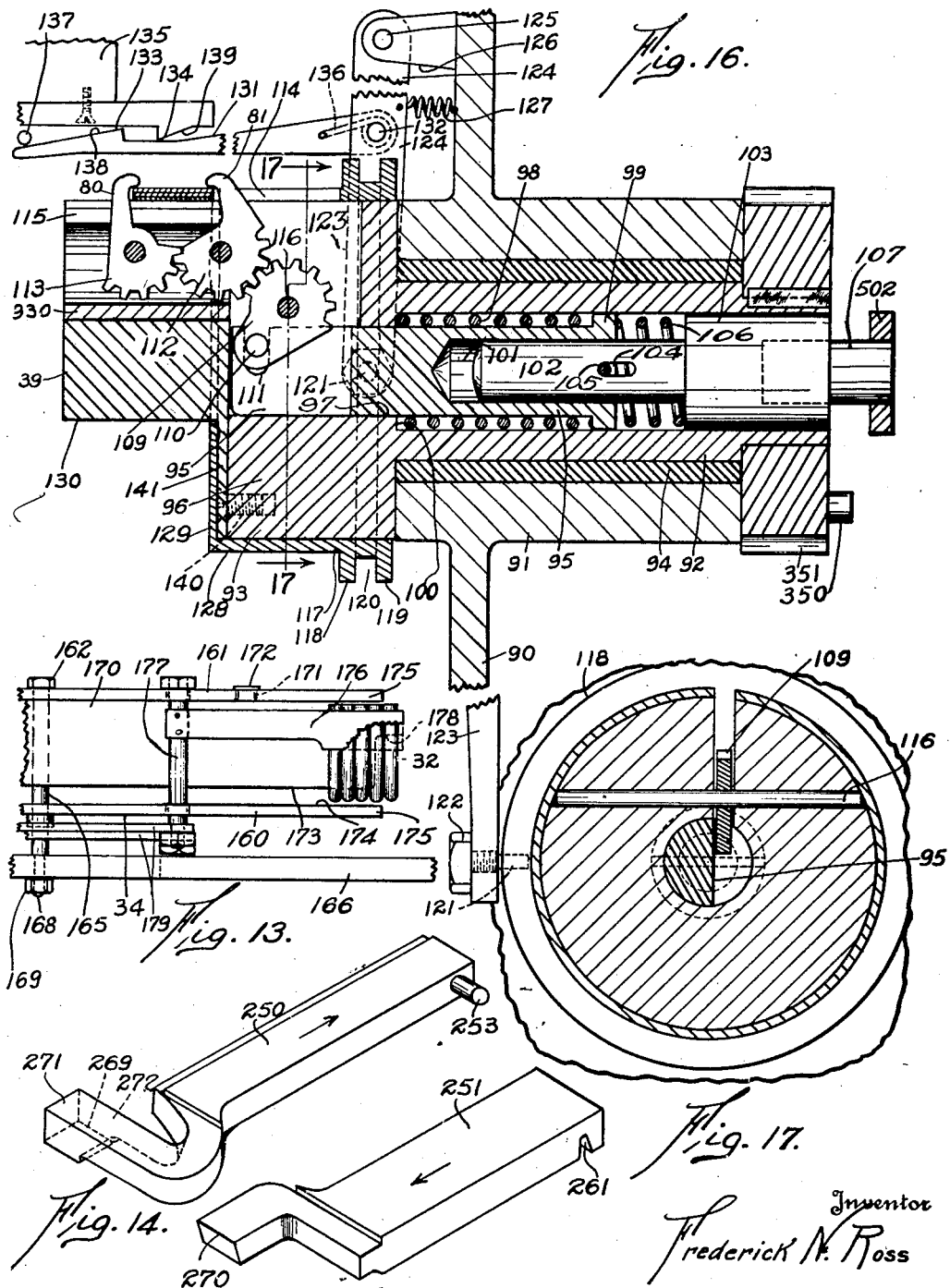

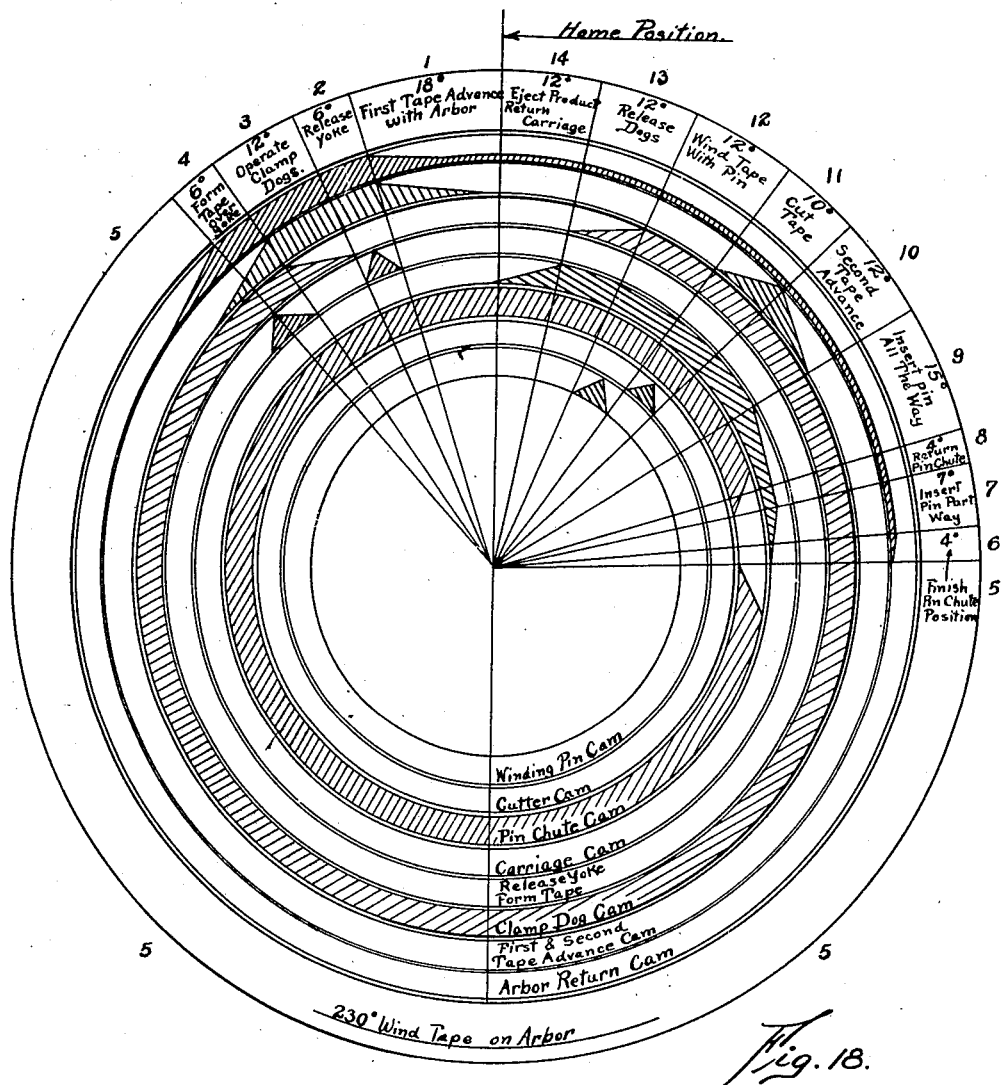

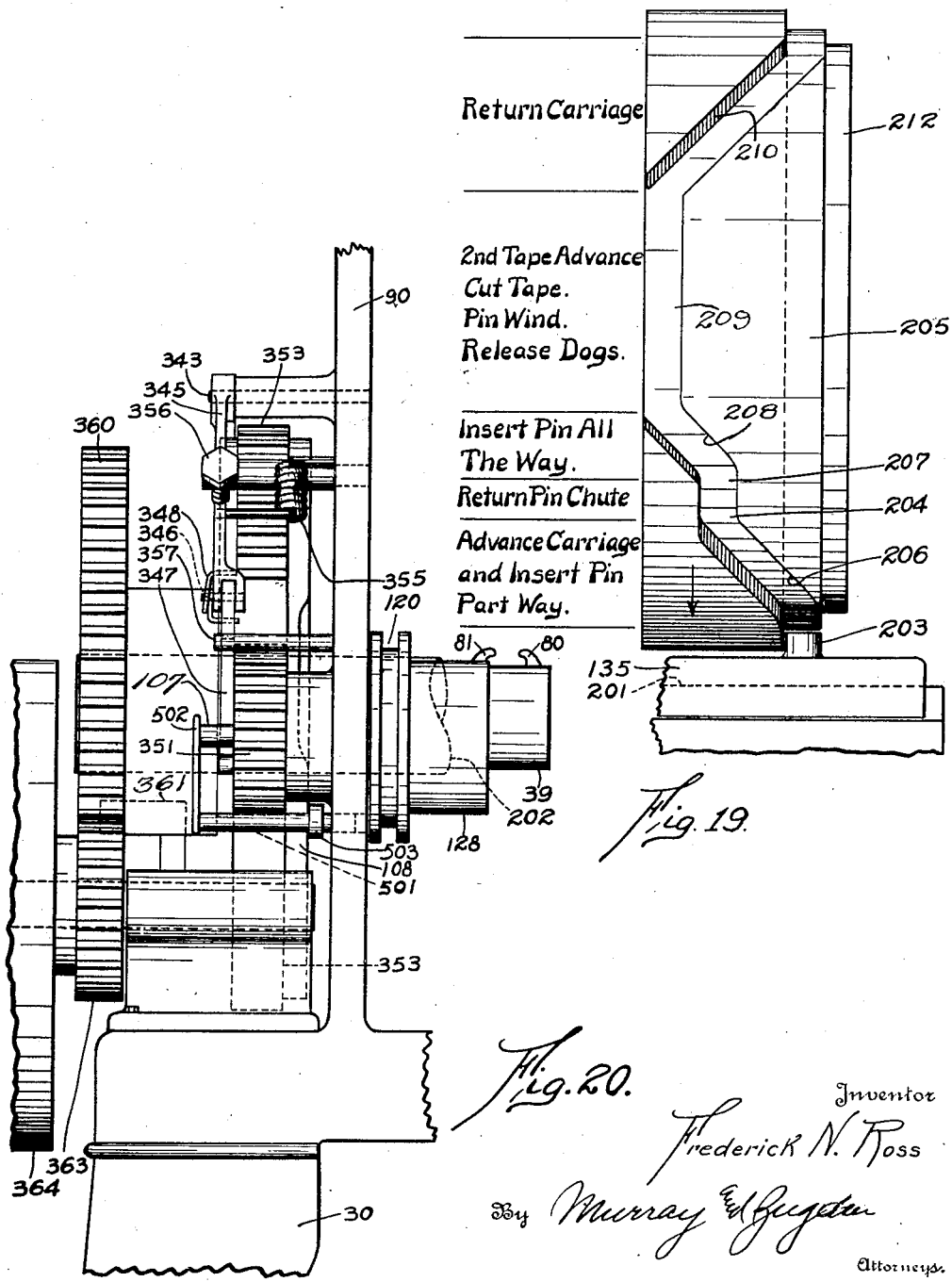

1,761,455

UNITED STATES PATENT OFFICE

FREDERICK N. ROSS, OF DETROIT, MICHIGAN, ASSIGNOR, BY MESNE ASSIGNMENTS, TO PEOPLES CLAMP CORPORATION, OF WYANDOTTE, MICHIGAN, A CORPORATION OF MICHIGAN

MACHINE FOR MANUFACTURING HOSE CLAMPS

Application filed April 16, 1927. Serial No. 184,413.

An object of the invention is to provide means for automatically manufacturing hose clamps and the like of the character shown in United States Letters Patent to Caillau, 1,546,059, of July 14, 1925.

Another object of the invention is to provide a simple and efficient device for the purpose stated.

These and other objects are attained by means described herein and disclosed in the accompanying drawings in which:

Fig. 1 is a perspective view of a device for the purpose stated and embodying said invention.

Figs. 2, 3, and 4 are views showing a hose clamp of the character shown in the referred to Caillau patent, Fig. 3 being a view taken on line 3—3 of Fig. 2.

Fig. 5 is an enlarged fragmental view of a device for feeding yokes such as shown in Fig. 4 to an arbor about which the strap portion of the clamp is formed.

Fig. 6 is an enlarged sectional view on line 6—6 of Fig. 5.

Fig. 7 is an enlarged fragmental view of means for feeding and advancing metallic tape that is formed into hose clamps.

Fig. 8 is a plan view of a cam shown in Fig. 7, that serves to position the arbor in proper position for receiving tape preparatory to formation of the tape into a circular band.

Fig. 9 is an enlarged fragmental side elevation of a mechanism for feeding cotter pins to circular bands formed about the arbor and for imparting winding to the cotter pin after it is assembled with the band.

Fig. 10 is a plan view of a gear segment for imparting initial winding to the cotter pin when assembled with the circular band.

Fig. 11 is a plan view of a lever forming a detail of the invention and used for actuating shears for cutting the tape into lengths.

Fig. 12 is a fragmental view of a shaft and gear for imparting an initial winding to the cotter pin.

Fig. 13 is a fragmental plan view of the cotter pin magazine.

Figs. 14 and 15 are perspective views of shear members employed for cutting the tape.

Fig. 16 is an enlarged view on line 16—16 of Fig. 5, and shows the internal construction of the arbor and means operative therewith.

Fig. 17 is a sectional view on line 17—17 of Fig. 16, showing an ejector on the arbor.

Fig. 18 is a diagrammatic chart showing the various movements of the various parts of the clamp and cam sections of the device shown in Fig. 1.

Fig. 19 is a fragmental side elevation of a carriage and actuating means therefor, forming details of the invention.

Fig. 20 is a view on line 20—20 of Figs. 1 and 7 showing the relationship of the reduction gearing, clutch and arbor positioning means shown in Fig. 7.

Figure 1:
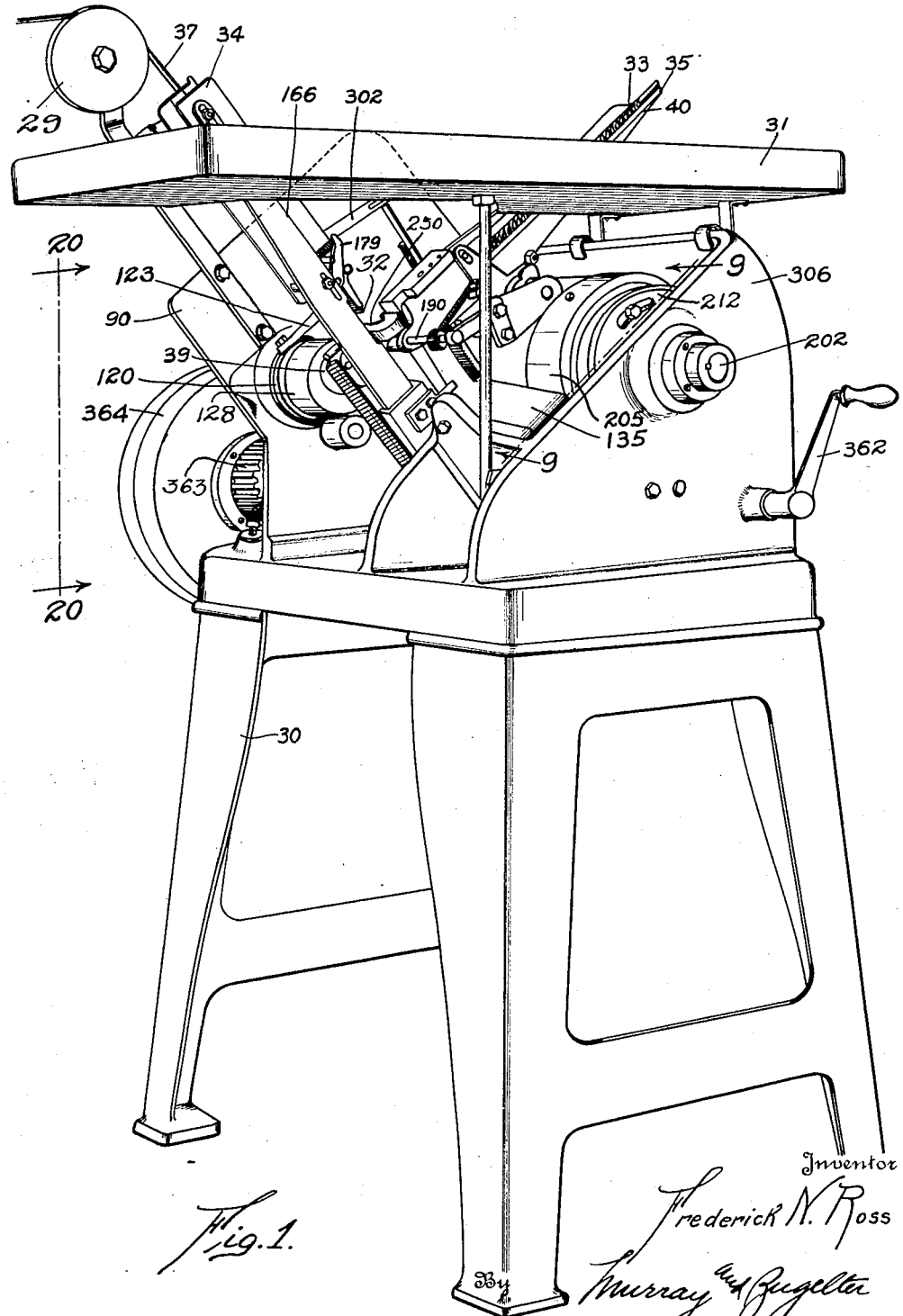

The base 30 supports various mechanisms including a table or rest 31 that in the present embodiment of the invention may be used to receive supplies of cotter pins 32 and yokes 33. An attendant feeds the cotter pins to a magazine shown at 34 in Fig. 1. The attendant also feeds the yokes 33 to a yoke magazine 35 shown in Fig. 1. In Fig. 1 there is shown a section of tape 37 extending about a roller or drum 29. The tape 37 may come from any suitable magazine, not shown. The various mechanisms shown in perspective in Fig. 1 are adapted to feed lengths of tape 37 to an arbor 39 and to assemble with such tape a cotter pin 32 and a yoke 33.

Directing attention to Fig. 5, it will be explained how the tape and the yoke are assembled. An inclined guide or slide 40 is fixedly mounted in relation to the base 30 and the other stationary parts of the device and is adapted to receive the individual yokes 33. The slide 40 has an upwardly projecting ledge or rib 41 of a width substantially equal to that of the space between the loops or eyes 42 and 43 formed on the yoke 33. The loops 42 and 43 are connected by cross bars 44 and 45 and said cross bars ride upon the upper surface of the ledge or rib 41. Gravity feeds the yokes along the slide 40. A plate 46 is disposed above the rib 41 and with said rib provides a confined way 77 within which the cross bars 44 and 45 of the yoke are disposed. The plate 46 may be mounted in any suitable manner such as arms or brackets 47 secured to any suitable place upon a stationary part of the device or slide. At the lower end of the slide 40 means are provided for feeding individual yokes from the slide to a portion of tape. By reference to Fig. 5 it will be noted that tape 37 has its end 38 turned upwardly and that said end 38 lies adjacent the lower end of the rib 41, wherefore it follows that upon separation of one of the yokes 33 from the rib 41, such yoke will assume the position of the yoke 33 lying upon the arbor 39. The means for separating a yoke from the slide comprises a bell crank lever 48 having a pivotal mounting 49 upon a sliding plate 50. Sliding plate 50 is reciprocally mounted upon the cover or plate 46 extending over the rib 41. The reciprocal mounting of the reciprocating member 50 is attained by means of screws 51 that extend through an elongated slot 52 formed in the member 50 and are threaded into the plate 46. The short arm 53 of the bell crank lever 48 carries a bearing 54 that is received in a recess 55 formed in the lug 56 carried by and extending upwardly from the reciprocating plate 50. The pivotal mounting 49 of the lever 48 is upon the lug 56. Sufficient play is provided between the bearing 54 and the walls of the recess 55 that upon movement of the lever 48 about its pivotal mounting 49, the lugs 57 and 58 formed at the end of the long arm 59 of lever 48, are moved toward the lowermost yoke 33 upon the rib 41, said lugs 57 and 58 assuming positions on opposite sides of the bars 44 and 45 of such lowermost yoke 33. The indicated movement of the lever 48 about the pivotal mounting 49 is effected by means of a link 60 having a pivotal mounting for connection with the bearing 54 and which link is in turn pivotally connected at 61 with the long arm 62 of a lever 63 having a fixed pivotal mounting 64 upon slide 40. The short arm 65 of the lever 63 is provided with an elongated aperture 66 in which is inserted a pin like bearing 67 carried by a bell crank lever 68 having a pivotal mounting 69 upon slide 40 and provided with a lug 70. Upon engagement of the lug 70 with a suitable cam 450—452, the lever 68 is moved in a counter clockwise direction, see Fig. 5, thereby actuating lever 63 in a counter clockwise direction. Movement of lever 63, through the agency of link 60, serves to actuate bell crank lever 48 for bringing the lugs 57 and 58 upon lever 48 upon opposite sides of the lowermost yoke 33 upon rib 41, thereby positioning said cross bars on the yoke within the recess 71 formed between said lugs 57 and 58. The continued movement of the various levers and link 60 serves to move the reciprocating member 50 longitudinally of the rib 41 thereby forcing the lowermost yoke 33 beyond the spring-actuated check member 72 carried by the magazine slide 40. The check member 72 is pivotally mounted at 73 upon the member 40 and a spring 74 normally holds the free end 75 thereof in position to intercept the eyes or loops such as 43 on the lowermost yokes carried by the slide 40. The interposition of the lug 57 between the two lowermost yokes on the slide 40 precludes the yoke next to the last at the bottom of the slide from escaping from the rib 41. From Fig. 5 it is evident that as soon as the lowermost yoke has been released from the check 72 it will move beyond the slide 40 and will straddle the upturned end 38 formed on the tape 37, one eye or loop 42 of the yoke lying on one side of the tape and the other loop 43 lying on the opposite side of the tape. A check 76 is pivotally mounted upon the plate 46 and is so weighted that normally it closes the lower end of the way within which are disposed the portions of the yoke comprising the cross bars 44 and 45. The weight or check member 76 is insufficient to preclude discharge of the yokes from the way 77 after the release of the yokes from the check 72. The check 76 serves to retard the movement of the yokes under the influence of gravity so that upon movement of the yokes into contact with the arbor 39, the yokes will remain in contact with such arbor and will not spring away therefrom because of any force of impact with the arbor. It is to be noted that a projecting ledge 78 is provided at the rear and below the end 38 of the tape 37. This ledge serves as an abutment to preclude the end 38 of the tape passing beyond a position in which it may be contacted by a finger 79, the purpose of which will be explained hereafter. Immediately after a yoke has straddled the tape 37, a pair of clamps 80 and 81 carried by a mandrel 93, see Fig. 16, engage the yoke and clamp same in the position shown in Fig. 5. At or about this time the finger 79 is reciprocated and bends the ends 38 of the tape over the cross bars 44 and 45 of the yoke so that said end 38 assumes the position shown in Fig. 3. The finger 79 is provided with pin like bearings 82 that are reciprocally received in elongated openings 83 in the yoke slide 40. The lower end of the member 40 may be recessed to provide a way within which the finger 78 may be received. Suitable apertures such as 84 may be provided in the lower portion of the member 40 to permit mounting of the member 40 upon cross bars or the like carried by the frame or base 30 and the structure provided thereon. The end 85 of the member 79 is pivotally mounted at 86 upon a lever 87 having a pivotal mounting 88 upon the member 40. Lever 87 carries a roller 89 adapted to engage a suitable cam 400 for actuating said lever and finger.

Attention is now directed to Fig. 16 for explaining the operation of clamps 80 and 81 for clamping a yoke upon the arbor 39. The side wall 90 of the upper structure supported by the base 30 is provided with a sleeve like member 91 in which is revolubly mounted the stem 92 of an arbor supporting mandrel 93. The mandrel 93 is adapted to have mounted upon it the arbor 39 which is detachable and interchangeable with arbors of various sizes, whereby to accommodate the device to the manufacture of clamps of various diameters. A suitable bearing 94 is provided between the stem 92 and the inner wall of the sleeve like member 91. The stem 92 is tubular and receives a reciprocating member 95 that projects into the main portion or body 96 of the arbor 93. The reciprocating member 95 has a suitable bearing upon the mandrel 93 at 97. The reciprocating member 95 is spaced from the inside wall of the stem 92 at a sufficient distance to accommodate a spring 98 between said member 95 and the stem 92, except for a head 99 formed on the reciprocating member 95 and which head serves as an abutment for one end of the spring 98. The other end of the spring abuts the shoulder 100 formed on the body 96 of the mandrel 93. The reciprocating member 95 has formed in its outer end an annular bore 101 within which is received a pin 102 having a bearing portion 103 slidably mounted in the outer end of the sleeve or stem 92. The member 102 is provided with an elongated transverse aperture 104 through which extends a pin 105 carried by the head 99 of the reciprocating member 95. A spring 106 has its opposite ends in abutment upon the head 99 and the bearing 103. A stud 107, carried by bearing 103, is connected to reciprocating stem 501 by strap 502 and is adapted for cooperation with pin 102 and a suitable cam or actuating means 108, for reciprocating the pin and actuating the clamps. Stem 501 is reciprocally supported by wall 90 and carries a finger 503 having a semiglobular lug 504 at its end, said lug 504 riding upon the side of the cam 108 because of the action of spring 106, see Fig. 16. The cam 108 has a recess in its side and upon entry of lug 504 into said recess, the springs 106 and 98 actuate the pin 102 and member 95 outwardly and the jaws 80 and 81 are oscillated and brought within the mandrel 93, as explained in detail hereafter. Within the body 96 of the mandrel 93 there is pivotally mounted a gear segment 109. The segment 109 carries a pin 110 that is received in a slot 111 formed in the reciprocating member 95. From the foregoing it is to be understood that longitudinal reciprocation of the member 95 serves to oscillate the gear segment 109. The gear segment 109 engages a gear segment 112 formed upon the lower end of the pivotally mounted clamping jaw 81 and the gear segment 112 engages the gear segment 113 formed upon the lower end of the pivotally mounted clamping jaw 80. Suitable openings 114 and 115 are provided in the fixed portions of the mandrel structure to permit the clamping jaws 80 and 81 to be moved to positions within the body lines of the mandrel. It should be noted that the clamping jaws 80 and 81 are carried by a sleeve like projection 930 formed upon the mandrel 93 and that the detachable arbor 39 extends about said sleeve like projection 930 and is secured to the body 96 of said mandrel by means of suitable screws 140 projecting through the plate like extension 141 carried by the detachable arbor 39.

Means are provided for ejecting hose clamps from the arbor after formation thereof. This ejector means is disclosed in Fig. 16 wherefore same will be explained at this time. The ejector member comprises a collar like portion 117 slidable along mandrel 93 and provided with a pair of annular flanges 118 and 119 between which is formed a groove or way 120 for receiving pins 121 formed on the ends of bolts 122 that are screwed into the arms 123 of a yoke like member 124 which is pivoted at 125 upon brackets 126 carried by the side wall 90. A suitable spring 127 yieldingly retains the ejector member in its normal position. The ejectors are varied with the detachable arbors 39. It should be noted that the ejector body 128 carries a centerwardly extending member 129 that has its inner end disposed adjacent the face 130 about which the hose clamp is formed. Different ejectors are required with different size hose clamps because it is necessary to apply even lateral pressure upon the hose clamps to move the hose clamps laterally of the detachable arbor 39 for ejecting such hose clamps from the arbor. The means for actuating the hose clamp ejector laterally for discharging hose clamps from the arbor comprises an arm 131 having a pivotal mounting 132 upon the member 124. The arm 131 is provided with a lug 133 that may be engaged by a lug 134 upon the carriage 135. The carriage is capable of movement in parallelism with the axis of the arbor, wherefore the carriage movement is utilized for actuating the ejector mechanism. A spring 136 yieldingly retains the lever 131 in engagement upon a suitable stop or lug 137 and also retains the lug 133 in the path of the lug 134. The rear faces 138 and 139 of lugs 133 and 134, respectively, are tapered, wherefore the movement of face 138 over the lug 137 under the influence of lug 134 serves to disconnect the lugs 133 and 134, thereby permitting the lug 134 to continue its movement with the carriage 135, and at the same time permitting the member 131 to return to its normal position under the influence of spring 127 after the ejector has functioned, and also said arrangement permits the lug 134 to move past the lug 133 for disposing said lugs in the positions shown in Fig. 16, for again conditioning said lugs for another ejecting action.

After a yoke has been positioned upon the arbor and after the clamping jaws 80 and 81 have been moved into clamping position upon the said yoke and tape, as disclosed in Fig. 5, the mandrel is revolved. For each revolution of the mandrel the finger 79 is reciprocated once. This reciprocation of the finger 79 is used not only to bend the end 38 of the tape downward over the cross bars of the yoke but also to form the tape as shown at 142 in Fig. 3, to facilitate insertion of the cotter pin in the yoke.

There will now be described the means for feeding cotter pins, for assembling a cotter pin with a yoke and an annular band of tape and also the means for imparting an initial winding to the cotter pin after assembly thereof with the yoke and tape. The cotter pin magazine 34 comprises a pair of side plates 160 and 161 both of which are of substantially identical form and shape, see Figs. 9 and 13. The plates 160 and 161 are held in spaced relation by means of suitable bolts 162 and 163. Any suitable structure for attaining said result may be employed, for example, the bolts may be provided with suitable shoulders against which the plates 160 and 161 may abut or spaced sleeves such as 165 may be mounted upon the bolts for attaining the indicated spacing of said plates. The plates are mounted upon a reciprocating arm 166 and may be adjusted longitudinally of said arm 166 by any suitable arrangement, for example, by providing elongated slots 167 in the reciprocating arm 166 and through which slots the screw shanks 168 of the bolts such as 163 may extend and upon which screw shanks there may be mounted suitable nuts 169 for clamping the various parts in various adjusted positions. The plate 161 carries a slide 170. The slide 170 may be attached to plate 161 in any suitable manner such as by providing apertures 171 in the plate 161 and through which apertures there may be projected lugs 172 that have their outer ends peened for securing same against separation. The edge 173 of the slide 170 is spaced from the inside wall 174 of the plate 160 at a sufficient distance to receive the heads or eyes of the cotter pins 32. The plate 170 is disposed between the legs of the cotter pin. The cotter pins may be placed upon plate 170 by an attendant or they may be fed from a suitable hopper. At the lower end of the magazine the side plates 160 and 161 are provided with long tapering fingers 175 between which the slide plate 170 extends and between which the cotter pins feed. The lowermost cotter pins are precluded from escaping from the magazine by means of a pair of flat springs 176 that are mounted upon bolts 177 rotatably supported by plates 160 and 161 and said springs 176 frictionally engage the lowermost cotter pin disposed at the lower end of the magazine. By reference to Fig. 13, it will be noted that the lowermost cotter pin or end cotter pin is retained upon the lug like projection 178 of the slide plate 170 merely by its frictional contact with the pair of springs 176. Each of the springs 176 has its associated bolt 177 fixedly connected with a link 179. The free ends of the links 179 are connected by a spring 180. A suitable lug 181 is provided for limiting the movement of the links 179 under the influence of the spring 180. It is evident that when a cotter pin is withdrawn from the ends of the flat springs 176, such withdrawal is against the action of the spring 180.

The reciprocating arm 166 is adapted to carry the cotter pin magazine to a position in alignment with the winding shaft 190 revolubly supported by the carriage 135. The winding shaft 190 carries a pinion 191 that engages a gear segment 192. The gear segment is pivotally mounted at 193 upon the carriage at the junction of the long arm 194 and the short arm 195 of a bell crank lever that carries said gear segment 192. A cam follower or roller 196 is provided at the end of the short arm 195 of said bell crank lever and engages a suitable cam 470 for imparting oscillating motion to the gear segment. The various parts are so related that at the time the winding shaft 190 is preparing to receive a cotter pin from the cotter pin magazine, the oblong recess or pocket 197 formed in the end of the winding shaft 190, is properly positioned to receive the head or eye of the cotter pin. By reference to Fig. 9, it will be noted that the cotter pin magazine may move diagonally downward under the influence of the spring 198. The cam 199 moves toward the right by means of spring 198 and pivotally mounted lever 200 serving as a cam follower and pivotally connected with said cam 199 thereby aligning the lowermost cotter pin with the pocket or recess 197 in the winding shaft 190. The center of the winding shaft 190 is aligned with the centers of the eyes or loops of a yoke 33 that is being held upon the arbor 39 wherefore as soon as a cotter pin is brought into alignment with the winding shaft 190 and the eyes in a yoke 33, it is necessary only that the cotter pin be moved laterally to associate same with a yoke and a tape band such as may be associated with the yoke. There are two lateral movements imparted to the cotter pin. Both lateral movements are imparted to the cotter pin by means of the winding shaft 190. The initial lateral movement of the cotter pin serves to project the ends of the legs of the cotter pin into one of the loops or eyes of the yoke 33. Thereupon the cotter pin magazine is lifted by means of cam 199. After the cotter pin magazine moves upwardly, the lowermost cotter pin is withheld from movement therewith because of the engagement of the legs of the cotter pin in one loop of the yoke that is clamped to the arbor and the engagement of the eye or head of the cotter pin in the pocket 197 in the winding shaft 190. At or about this time, the cotter pin magazine recedes from the arbor 39, and the carriage 135 together with the winding shaft 190 is given its second lateral movement and the cotter pin is moved transversely of the yoke 33. The free ends of the cotter pin pass on opposite sides of the tape and lodge in the second eye or loop of the yoke 35. Thereupon the gear segment 192 is actuated for imparting an initial winding to the cotter pin and completing the hose clamp. Reference to Fig. 9 will show that the carriage 135 is mounted upon a dove-tailed rail 201. The rail 201 extends transversely of the device and extends in parallelism with the main shaft 202. The carriage is movable longitudinally of the rail 201. It will be noted that upon the carriage 135 there is provided an upwardly projecting lug 203 that engages in or projects into a way 204 formed in a carriage cam 205 fixedly mounted upon the main shaft 202 for rotation with said shaft. By reference to Fig. 19 it will be noted that the projecting lug 203 is brought into engagement with the cam face of shoulder 206 and that the movement of said face 206 along the lug 203 serves to move the carriage to the left as shown in Fig. 19. For the purpose of clarifying the various movements the lower angular portion of the way 204 may be identified as the portion of the cam or way that advances the carriage and inserts the cotter pin part way into the yoke. When the lug 203 moves through the portion 207 of the way 204, the carriage becomes temporarily stationary. At this time the cotter pin magazine is lifted so as to clear the same from the path of the winding shaft 190. Thereupon the lug 203 engages the cam face 208 and the carriage is again moved to the left, see Fig. 19. On this movement of the carriage the cotter pin is inserted all the way into the yoke. The lug 203 then moves through the portion 209 of the way 204 and at this time the carriage has no lateral movement. Thereupon the lug 203 engages the cam face 210 whereupon the carriage is moved to the right or returned to its initial position.

By reference to Fig. 9 it will be noted that the carriage comprises an arm like member 211 through which the main shaft 202 extends. There is a second aligned arm like member similar to 211 and these arm like members receive between them the cams shown in Fig. 5, for actuating the pin winding mechanism as well as a mechanism for cutting the tape and which mechanism is about to be explained. The above mechanisms are supported by the carriage and are cam actuated by the cams disposed between the two arm like members such as 211. Such cams are splined on the shaft 202. Before explaining the tape severing mechanism, attention is called to Fig. 9 and the cam follower 200. It is to be noted that the cam follower 200 engages a cam face 212 formed on the cam 205. A depression 213 is provided in the cam face 212 and the entry of the cam follower 200 into the depression 213 permits the spring 198 to advance the cotter pin magazine to a position such that the lowermost cotter pin is aligned with the winding shaft 190. When the cam follower 200 is lifted out of the recess 213, the cotter pin magazine is elevated or moved away from the winding shaft 190.

The means for severing the tape comprises a pair of reciprocating knives 250 and 251. These knives are slidably received in a suitable way 252 provided in the carriage and are operated in opposite directions by means of a pair of bell crank levers. The knife 250 is provided with a laterally extending bearing pin 253 that is received in an elongated slot 254 in the arm 255 of the bell crank lever 256. The lever 256 is pivotally mounted upon the bearing 193 and comprises a second arm 257 that may carry a suitable roller 258 that engages a cam 259 carrying an outwardly projecting cam lug 260. The cam 259, shown in Fig. 9, moves in a counterclockwise direction. Accordingly, the knife 250 is shown in the position that it assumes immediately after having completed a movement for cutting the tape. The lower cutting knife 251 is provided with a transverse recess 261 in which is received a tooth 262 formed at the outer end of the arm 263 of bell crank lever 264 having a mounting upon the bearing 193. The bell crank lever 264 comprises a second arm 265 carrying a roller 266 that engages a cam 267. The cam 267 is provided with a projecting cam lug 268 that is engaged by the roller 266. The cams 259 and 267 are splined to the main shaft 202. The lower cutting knife 251 is shown in Fig. 9 in the position assumed by it immediately after completing a cutting operation upon the tape.

The detailed views of the cutting knives are shown in Figs. 14 and 15. The cutting edge of knife 250 is indicated at 269 and the cutting edge of knife 251 is shown at 270. Attention is called to the fact that the end 271 of the U-shaped portion of cutting knife 250 extends away from the observer of Fig. 9. Attention is called to the fact that the tape is cut at the bottom edge of the cutting knife 250 wherefore the inside wall 272 of the knife 250 serves as an abutment against which the tape end projecting from the tape supply abuts. The cutting knife 250 moves very close to the tape guide 273, see Figs. 5 and 7, wherefore the said face 272 on the cutting knife 250 serves to move the end of the tape with it as such face moves upwardly and to the right, see Fig. 5, and this action serves to turn the end of the tape at substantially right angles almost simultaneously with the severing of the tape. It therefore follows that immediately after the knives have completed their cutting operation the end of the tape for the next hose clamp has been formed so that it will receive the necessary yoke from the yoke feeding mechanism.

Before explaining the tape feed mechanism attention is called to the fact that the winding of the tape about the arbor 39 effects a rather tight winding of the tape. This condition of the tape permits ready insertion or entry of the tape between the legs or arms of the cotter pins. After the cotter pin has been moved its limit into the yoke, it is advisable to provide a certain amount of slack in the tape that has been formed about the arbor 39 so that the cotter pin may be given an initial turn for locking the cotter pin and tape together. In order to accomplish this the tape feed mechanism is adapted to effect a tape advance shortly before the cutting of the tape. This tape when advanced at this time serves to loosen the convolutions of tape about the arbor sufficiently that when the cotter pin is rotated as previously explained, the tape about the arbor may be drawn toward the cotter pin without clamping or binding the hose clamp upon the arbor to any extent that would preclude ready ejection of the hose clamp from the arbor.

It was previously explained how the upturned section 38 was formed at the end of the tape 37, see Fig. 5. In the initial explanation of the mechanism it was assumed without explanation that the tape end 38 shown in Fig. 5 had been given the form shown therein. At the time the end of the tape 38 is bent or formed it lies immediately adjacent the tape guide 273 as indicated in dotted line at 301 in Fig. 5. After the hose clamp formed about the arbor 39 has been ejected the tape 37 is advanced to move the turned section 38 of tape from the position 301 shown in Fig. 5 to the position indicated in full lines at the lower end of yoke slide 40.

The means for feeding the tape on both occasions to which reference was made, comprises a pivotally mounted lever 302, see Fig. 7, provided with an elongated slot 303 and a second elongated slot 304. The lever 302 has a pivotal mounting 305 upon the side wall 90 of the frame 306 carried by and projecting upwardly from the base 30. The larger elongated slot 303 formed in the lever 302 receives a pivotal connection such as a pin or bolt 307 adjustable longitudinally of the threaded end 308 of the link 309. The link 309 has a pivotal connection 310 with the arm 311 of the bell crank 312. The second arm 313 of the bell crank lever 312 carries a roller 314 that engages in a way 315 in a cam 316 keyed to the main shaft 202. The bell crank lever 312 has a pivotal mounting 317 upon the side wall 90. It will be noted that there are two outwardly extending portions 318 and 319 in the way 315 in the cam. When the roller 314 moves through the larger outwardly extending portion of said way the tape with its upturned end is fed from position 301 in Fig. 5, to the full line position of the end 38 shown in that figure. At the time the roller 314 moves through the smaller outward extension of the way 315 the tape is advanced a short distance immediately prior to cutting of the tape for the purposes previously explained.

Referring now to the lever 302 of the tape advance it will be noted that the smaller elongated slot 304 receives a pin 320 carried by a bracket or sliding carriage 321 reciprocally mounted on a rod 322. This bracket or carriage 321 carries suitable means for engaging the tape 37 and feeding same toward the arbor 39 in response to the co-operative action of the cam 316 and the bell crank lever 312. It will be noted that the previously referred to tape guide 273 and the tape guide 323 may be in the nature of lugs struck from or cast upon the side wall 90 of the frame and that the ways 324 and 325 formed in said lugs 273 and 323, respectively, are substantially in alignment. The carriage 321 is bifurcated at its lower outer end, whereby there are formed a pair of downwardly and outwardly projecting lugs or ears 326 between which the tape 37 passes. The face 327 of the carriage 321 lies immediately adjacent the tape 37 and an eccentrically mounted roller 328 is adapted to press the tape 37 against the face 327 during the counter clockwise movement of the lever 302, thereby clamping the tape and advancing same toward the arbor 39. The eccentric roller 328 is adapted to release the tape upon the clockwise movement of the lever 302, wherefore the tape remains at its advanced or fed position. The means for controlling the operation of the roller 328 comprises a spring 329 having its one end 330 in engagement with the circumference of the roller 328 and having its other end 331 in engagement upon the edge 332 of the ear 326. The spring may have a convolution or a number of convolutions thereof developed about the pivot 333 that serves to mount the roller 328 upon the ears 326. A suitable adjustment screw 334 is adjustable toward and away from the roller 328 for relieving the pressure that the roller would otherwise exert upon the tape 37, leaving the tape free to advance as the arbor 39 revolves. From Fig. 7 it is evident that the roller 328 may move in a clockwise direction about its pivotal mounting 333 except as it may be urged in an opposite direction by the spring 329. At the time when the lever 302 moves in a counter clockwise direction, the roller 328 tends to move in a counter clockwise direction because of the contact of the roller 328 with the tape 37, wherefore the roller under the influence of spring 329 clamps the tape 37 against the face 327 of the carriage 321. The clamps 80 and 81 on the arbor may hold the tape as carriage 321 is returned.

The cam 316 is disposed adjacent one side of the wall or partition 90 and on the opposite side of said wall or partition there is disposed a mutilated gear 353 to which is attached a cam 341, see Figs. 7 and 8. A bell crank lever 342 has a pivotal mounting 343 upon the partition wall 90 and has the end of its one arm 344 in position to engage the cam 341. The second arm 345 carries a pivotal mounting 346 carrying a lever 347. A spring 348 associated with the pivotal mounting 346, the arm 345 and the lever 347 yieldingly urges the hooked and free end 349 of the lever 347 toward a pin 350 carried by a gear 351 keyed to the mandrel, see Figs. 7 and 16. The function of the pin 350 and the levers just referred to is to assure positioning of the mandrel in the same position at the beginning of each assembly of and formation of a hose clamp. The gear 351, shown in dot and dash lines in Fig. 7, is adapted to engage the teeth 352 of the mutilated gear 353 keyed to the main shaft 202. The gear ratio between the mutilated gear 353 and gear 351 is such that for each revolution of the mutilated gear 353 the gear 351 is given two complete revolutions thereby assuring two convolutions or windings of the tape about the arbor during the formation of a hose clamp. It will be noted that the arbor 39, see Fig. 7, revolves in a clockwise direction, wherefore the pin 350 carried by the gear 351 will contact the lever 347 at about the longitudinal center thereof, wherefore as the pin 350 moves along the lever 347 it actuates said lever against the resistance of spring 348. The pin 350 falls into the pocket 354, wherefore the lever 347 and spring 348 advance the mandrel after the mutilated gear 353 releases gear 351 and returns the mandrel to the same position, namely, that shown in Fig. 7 after each tape winding operation. A suitable spring 355 has its opposite ends connneced to the partition wall 90 and to the bell crank lever 342, for yieldingly urging the bell crank lever toward the cam 341 that actuates the said elements. A suitable adjustment nut 356 is provided for limiting the movement of the bell crank lever 342 under the influence of the spring 355. An abutment pin 357 is provided for limiting the movement of the lever 347 under the influence of spring 348. The pin 357 may be in the nature of a lug or a boss formed on the partition 90 or may be in the nature of a pin projecting from the partition 90.

The main shaft 202 may be driven from any suitable source. As disclosed herein the main shaft has revolubly mounted upon it a gear 360 of substantially the same diameter as the mutilated gear 353. The revolubly mounted gear 360 may be connected to the main shaft 202 by any suitable clutch mechanism diagrammatically indicated at 361 and for which clutch mechanism a suitable lever or operating handle 362 may be provided. The clutch mechanism and operating handle may be of any suitable variety or kind, wherefore no detailed explanation thereof is made. The gear 360 is driven from a suitable gear 363 connected for movement with the pulley 364, mounted upon the base 30 or the upper frame work associated therewith. The arrangement of the pulley and gears 363 and 360 comprises a speed reduction device, the elimination of which is readily obvious providing an appropriate speed is given to the shaft 202 by any other means and from any suitable source of power.

Attention is called to Fig. 5. It will be noted that the roller 89 engages a cam 400 that may be referred to as the tucker cam and that said cam is provided with a pair of outwardly extending lugs 401 and 402 of different heights. The said lugs 401 and 402 are intended to each impart a movement of the tucker finger 79 toward the arbor 39. The relationship of said lugs is such that the end 38 of the tape is bent away from the yoke 33 held upon the arbor by the action of lug 401, whereupon the arbor makes one revolution and the lug 402 then actuates the tucker finger 79 for forming the tape as shown at 142 in Fig. 3 for attaining the result previously explained.

The lug 70 formed on the yoke discharging bell crank lever 68 is engaged by a lug 450 mounted on the yoke releasing cam 451. The lug 450 is shown in dotted position at 452 to indicate its co-operative relationship with the lug 70, although it is to be understood that there is but one lug 450 carried by the yoke releasing cam 451 and that the lug 450 is properly shown in its co-operative relationship to the other features of the device, in full line in Fig. 5.

In order to indicate the relationship of the various cams upon the main shaft 202, their order transversely of said shaft will now be stated. Beginning at the left hand end of the main shaft 202, looking at a machine in substantially the position shown in Fig. 1, the gear 360 is the first element mounted upon said shaft. Said gear is loosely or revolubly mounted upon shaft 202 as previously explained. At the right of the gear 360 is the clutch mechanism 361. Next to the clutch is the cam 341 that operates the arbor positioning device and comprising the bell crank lever 345 and the lever 347. The said cam 341 is mounted upon the left side or face of the mutilated gear 353. On the opposite face of the mutilated gear there is mounted a cam 108 that is engaged by semiglobular lug 504 and actuates stem 501 and the clamping jaws within the arbor and which clamping jaws secure the yoke upon the arbor preparatory to rotation of the arbor for winding two convolutions of tape about the arbor. Next in order, moving toward the right, is the partition wall 90 of the upper frame of the device. Next to the partition wall 90 is disposed the tape feed, shown in Fig. 7. Next in order is the cam 400 for actuating the tucker arm 79, see Fig. 5. Next in order is the cam 450 that may comprise a laterally extending lug formed upon the cam 400 for actuating the yoke feed mechanism, see Fig. 5. Next in order is an arm of the carriage such as 211. Between the pair of arms 211 of the carriage are disposed the various cams for operating the cutting knives for operation on the tape, and the means for imparting rotation to the cotter pin winding shaft 190, all of which are movable longitudinally of the main shaft with the carriage. The cams are disposed between the arms 211 in the order enumerated. At the right of the arm 211 of the carriage, disposed at the right end of the carriage, is the carriage actuating cam 205 and integral with which may be the pin chute actuating cam 212. The shaft then projects into the outer and right hand frame wall of the upper or frame 306.

In explaining the operation of the device attention is called to a diagrammatic chart shown in Fig. 18. The diametrically extending line indicated as the home position will be considered the beginning position of the various mechanisms preparatory to assembling a hose clamp. The mechanisms at this time are in substantially the positions shown in all of the drawings and at this time the tape has its upturned end 38 as shown in the dotted lines in Fig. 5. The rotation of the main shaft thereupon brings the outwardly projecting extension 319 in way 315 in cam 316, see Fig. 7, into such position that the tape advance or feed mechanism is operated to advance the tape feed so that the turned end of the tape is moved from the dotted line position 301 shown in Fig. 5, to the full line position of the upturned tape end 38. The upturned tape end 38 is now ready to receive a yoke. The next action is the operation of the lever 68 by the cam 450, see Fig. 5, discharging the lowermost yoke 33 from the slide 40, such lowermost yoke assuming the position of the yoke 33 disposed upon the arbor 39 in Fig. 5. The next operation is the inward projection of the pin 102, see Fig. 16, of the yoke clamping mechanism, by means of the cam 108. The clamping jaws or dogs 80 and 81 within the mandrel are brought into position to clamp the yoke upon the arbor and to thereby secure the tape thereupon, such tape being held between cross bars 44 and 45 of the yoke, and the arbor 39. Next in order the tucker finger 79 is actuated by the lug 401 thereby forming the end 38 of the tape over the cross bars 44 and 45 of the yoke, see Fig. 5. The next operation consists of the winding of two convolutions of tape about the arbor. During the time the arbor is making its two revolutions the cotter pin magazine moves toward the arbor under the influence of the spring 198, see Fig. 9. This movement is occasioned by the operation by the cam 212 of the cam follower 200 and the slide member 199 operating upon the reciprocating bar 166. Tucker finger 79 is again actuated. The lowermost cotter pin supported by the cotter pin magazine now is held in alignment with the winding shaft 190 on the carriage 135 and with eyes or loops 42 and 43 in the yoke clamped upon the arbor. The spring arms 176 permit the eye of the cotter pin to enter the recess 197 in the winding shaft 190 and to cause such entry, the carriage 135 is now given lateral movement toward the arbor. This movement of the carriage causes the cotter pin to move laterally between the spring arms 176 so that the free ends of the cotter pin are introduced into one of the eyes or loops of the yoke and the head or eye of the cotter pin is introduced into the recess 197 in the winding pin 190. The movement of the carriage is effected by the engagement of the lug 203, see Fig. 19, with the wall 206 on the cam 205. The carriage becomes temporarily stationary because of the formation given to the way 204 at 207, see Fig. 19. At this time the cam follower 200 is lifted from the recess 213 in the pin chute cam 212, wherefore the cotter pin magazine is elevated and moved away from the arbor, the lowermost pin being held against movement therewith, wherefore such pin is withdrawn from between the spring arm 176 at the lower end of the cotter pin magazine. Thereupon the lug 203, see Fig. 19, engages the wall 208 of the cam 205 thereby moving the carriage laterally and in the same direction in which it moved previously, thereby causing the legs or arms of the cotter pin to pass on opposite sides of the tape section disposed between the loops 42 and 43 of the yoke 33 and causing the said free ends of the cotter pin to lodge in the loop of the yoke beyond the tape. Thereupon the mechanism shown in Fig. 7 is again actuated for imparting a feeding action or motion to the tape. At this time the roller 314 engages in the smaller outwardly projecting extension 318 in the way 315. This tape advance is sufficient to provide enough slack tape around the arbor that the cotter pin may be wound relative to the yoke and the tape without binding the tape upon the arbor. Next the cams shown in Fig. 9 actuate the cutting knives 250 and 251 for severing the tape. After the tape is severed, the continued movement of the cutting knife 250 turns the tape at its end to the dotted line position 301 shown in Fig. 5. The tape for the next hose clamp to be fabricated has its end formed simultaneously with the severance of the hose clamp already formed from the tape 37. Thereupon the gear segment shown in Fig. 10 is actuated from its associated cam 470 for imparting a winding action to the winding shaft 190. This winding action of the shaft 190 is transmitted to the cotter pin whereupon the end of tape severed in the previous action is wound around the cotter pin and also the slack tape is taken up from the convolutions of the tape extending about the arbor. Next the cam 108, see Fig. 16, permits the pin 107 to move to the right, under the influence of springs 98 and 106, whereupon the dogs or clamps 80 and 81 release the yoke positioned on the arbor. Thereupon the carriage is moved toward the right by the engagement of the lug 203, see Fig. 19, upon the wall 210 of the cam 205, wherefore the catch or latch 134, see Fig. 16, engages the lever 131 associated with the ejector and moves the ejector mechanism laterally of the arbor for discharging the completed hose clamp from the arbor. The stationary pin 137 associated with the lever 131 serves to operate the latch 134 of the lever 131 after the hose clamp has been discharged from the arbor, whereupon the ejector device may return to its normal position under the influence of the spring 127, and the carriage may return to its normal or starting position preparatory to the formation of the next hose clamp. In this regard it should be noted that as the carriage moves laterally during the formation of a hose clamp, the lever 131 permits the catch 134 to move past the tooth or lug 133 formed upon lever 131 whereby the ejector device is conditioned for operation upon the return of the carriage to its normal or starting position.

What is claimed is:

1. The combination of a cotter pin feeding means, yoke feeding means, tape feeding means and means for assembling a cotter pin, a yoke and tape into a hose clamp.

2. The combination of cotter pin feeding means, yoke feeding means, tape forming means for developing sections of tape into ring like form, means for feeding tape to the tape forming means, and means for assembling a yoke and a cotter pin with each ring like section of tape.

3. The combination of a reciprocally mounted cotter pin magazine, means for feeding tape, means for developing tape into ring like form, means for feeding yokes to the means for developing the tape into a ring, means for securing yokes upon the tape, means for withdrawing cotter pins from the cotter pin magazine said means successively withholding a cotter pin against movement with the cotter pin magazine for withdrawing successive cotter pins from the magazine, means for assembling a withdrawn cotter pin with the yoke and the ring shaped tape, means for imparting rotatory motion to the cotter pin for causing the cotter pin to wind up a portion of the tape about the cotter pin, means for severing the ring like portion of tape from a supply of tape adapted to be operated upon by the tape feeding means and means for ejecting the assembled tape, yoke, and cotter pin, from the means for developing the tape into ring like form.

4. In a device of the class described, the combination of a drive shaft, a carriage mounted for reciprocation longitudinally of the drive shaft, complementary means on the drive shaft and the carriage for effecting step by step movement of the carriage longitudinally of the drive shaft, tape shearing means carried by the carriage, a winding shaft carried by the carriage, means operating between the winding shaft and the drive shaft for imparting rotatory motion to the winding shaft, means associated with the drive shaft and the tape shearing means for actuating the tape shearing means from the drive shaft for severing a band of tape into sections, said tape shearing means comprising forming means for turning tape at its end at substantially right angles to the remaining portion thereof, means for feeding tape, a mandrel to which said feeding means is adapted to advance the tape, a yoke magazine, means operative from the main shaft for successively feeding yokes from the yoke magazine to a turned end of tape, means associated with the mandrel for clamping the yoke and the tape upon the mandrel, means operated from the drive shaft for revolving the mandrel for forming convolutions of tape about the mandrel, a reciprocally mounted cotter pin magazine, means operated from the drive shaft for reciprocating the cotter pin magazine for successively disposing the lowermost cotter pin in said magazine in alignment with a yoke clamped upon the mandrel and with the winding shaft mounted upon the carriage, and for actuating the cotter pin magazine in a direction away from such yoke and winding shaft, the means operative from the drive shaft for operation on the winding shaft adapted to actuate the winding shaft longitudinally of the drive shaft for causing the winding shaft to receive the lowermost pin in the cotter pin magazine and to partly insert same in the yoke aligned with said winding shaft and the lowermost cotter pin while the cotter pin magazine is in its first mentioned position and to further actuate the winding shaft longitudinally of the drive shaft upon movement of the cotter pin magazine from its said first mentioned position for causing the arms of the cotter pin to receive the tape between them, the aforementioned means operative between the tape shearing means and the drive shaft actuating the tape shearing means for severing the tape after the cotter pin has straddled the tape, means operative between the winding shaft and the drive shaft for rotating the winding shaft and the cotter pin after severance of the tape, and means for ejecting the assembled tape, yoke, and cotter pin from the mandrel.

5. A tape feeding, forming and severing device comprising a pair of spaced arms provided with ways therethrough, adapted to have a section of tape extending through said ways, reciprocally mounted tape holding means for imparting unidirectional movement to tape engaged by it, a pair of shearing jaws movable adjacent one of said tape receiving arms and comprising shearing edges, and means for effecting relative movement of said shearing edges when disposed on opposite sides of such tape, one of said jaws having a shoulder for engaging a section of tape projecting from one of said arms after the tape has been severed and for bending said tape along said tape receiving arm and at an angle to the remainder of said tape.

6. In a tape feeding device the combination of a pair of spaced arms having aligned way therein through which tape may reciprocally extend, a rod extending between said arms and in substantial parallelism with the ways formed in said spaced arms, a block reciprocally mounted on said rod, said block having a pair of spaced lugs adapted to lie on opposite sides of the tape extending between said ways, an eccentrically mounted friction device for yieldingly holding tape against said block, and disposed between the lugs in the block and adapted to clamp the tape upon the block upon movement thereof in one direction and for yieldingly holding the tape against the block when moving in the opposite direction, and means for reciprocating the block on the rod.

7. A tape shearing device comprising a carriage having a way therein, a pair of shearing jaws disposed in the way and reciprocally mounted therein, each jaw having an offset normally spaced from the other and provided with a shearing edge disposed immediately adjacent its associated jaw and means for reciprocating the jaws in the carriage for causing the shearing edges to move relative one another for shearing between them tape that may be inserted therebetween.

8. In a tape shearing device the combination of a carriage, a pair of complementary shearing jaws reciprocally supported on the carriage, one of said shearing jaws having a substantially U-shaped end having a shearing edge thereon and at the bottom thereof whereby an upwardly projecting abutment face is provided thereon against which a tape may abut, the other shearing jaw having a substantially L-shaped end having a shearing edge at its top, said shearing edges adapted to pass one another by reciprocation of the jaws longitudinally of one another, and means for reciprocating the jaws for causing the shearing edges to move relative one to the other at substantially right angles to the tape.

9. In a tape shearing device the combination of a carriage, a pair of complementary shearing jaws reciprocally supported on the carriage, one of said shearing jaws having a substantially U-shaped end having a shearing edge thereon and at the bottom thereof, whereby an upwardly projecting face is provided thereon, the other shearing jaw having a substantially L-shaped end having a shearing edge at its top, said shearing edges adapted to pass one another by reciprocation of the jaws longitudinally of one another, means for reciprocating the jaws for causing the shearing edges to move relative one to the other, and an abutment adjacent which the U-shaped end of the one shearing jaw may move for co-operation with the upwardly extending face formed on said jaw for turning tape severed by the jaws and extending from the point of severance to said abutment, whereby to dispose such said end of tape in substantial parallelism with the line of reciprocation of said shearing jaws.

10. In a cotter pin feeding device the combination of a magazine comprising a guide upon opposite sides of which the legs of cotter pins contact and along which the cotter pins may feed, and sides for precluding displacement of the cotter pins from said guide, yielding means for retaining cotter pins upon the guide after the cotter pins have moved beyond the sides of the magazine, and means for moving the magazine to and from position for withdrawal of cotter pins from between said yielding means.

11. A yoke feeding device comprising a magazine having an upstanding rib along which yokes may move, means for retaining yokes upon the rib, each yoke comprising a cross bar provided with loops at its opposite ends and between which loops the rib is received and upon which rib the cross bars may contact, a finger disposed at one end of the rib for yieldingly resisting movement of the yokes from the rib, an arm mounted for pivotal and reciprocating motion relative to the magazine and having a bifurcated arm within which cross bars of individual yokes may be received, and means for reciprocating the arm along the magazine and for moving the arm about its pivotal mounting for successively advancing yokes beyond the yielding finger.

12. The combination with a mandrel and means for holding tape thereupon with an end of said tape projecting away from said mandrel, of means for feeding a yoke member to the said turned end of the tape and means for bending the tape toward the mandrel for causing the tape to enclose the yoke.

13. The combination with a mandrel for holding tape, of means for feeding a yoke to tape held upon the mandrel, means for winding the tape about the mandrel, means for associating a cotter pin with the yoke and the tape formed on the mandrel, means for feeding the tape for providing a portion of slack tape about said mandrel and means for revolving the cotter pin together with the tape whereby the slack in the tape is taken up and the cotter pin yoke and tape are developed into and assembled ring-like structure.

14. The combination with a mandrel for forming tape, means for feeding a yoke to tape supported by the mandrel, said mandrel comprising means for positioning tape in a yoke receiving position and means for assuring the proper positioning of the mandrel for holding the tape in proper position for receiving a yoke from the yoke feeding means.

15. In a mandrel the combination of jaws movable to and from position for clamping tape upon the mandrel, means for moving the jaws to and from clamping position and means for rotating the mandrel, the jaws and the jaw actuating means for forming annular bands about the mandrel and means for ejecting annular bands from the mandrel.

16. The combination with a mandrel for holding tape in a yoke receiving position, a yoke feeding means adapted to feed individual yokes to tape held in yoke receiving position by the mandrel, and a check means interposed between said mandrel and the yoke feeding means for effecting controlled positioning of yokes upon tape after release of the yokes from the yoke feeding means.

17. A cotter pin magazine comprising a pair of opposed side plates, a fin extending between the plates, the fin adapted to receive the arms of cotter pins upon its opposite sides and to have the eyes or heads of cotter pins interposed between it and one of the side walls of the magazine, the fin projecting beyond the ends of the said side plates, and means for yieldingly retaining a cotter pin upon the projecting end of the fin after the passage of the cotter pins beyond said side plates of the magazine.

18. The combination with a cotter pin magazine adapted to successively present individual cotter pins, of yieldable retaining means for successively receiving succeeding pins from the magazine and for effecting withdrawal of the cotter pins from the magazine, and means for moving the withdrawn cotter pins laterally for assembly thereof with determinable elements.

19. A cotter pin receiving device comprising a shaft mounted for rotation and movement longitudinally of itself, said shaft having a cotter pin receiving end, and means for rotating said shaft and for moving said shaft longitudinally of itself for effecting winding and assembling action upon a cotter pin received by said shaft.

20. In a tape feeding device the combination of periodically stationary means for imparting unidirectional movement to tape, and means for moving tape past said first mentioned means while said means is stationary.

21. In combination means for feeding fastening elements, means for feeding retaining elements, means for feeding a tension member and co-operating means for assembling a fastening element, a retaining element and a tension member into a finished clamp.

In testimony whereof, I have hereunto subscribed my name this 2nd day of April, 1927.

FREDERICK N. ROSS.